Patented Apr. 13, 1954

2,675,408

UNITED STATES PATENT OFFICE 2,675,408

SALTS OF DIBENZYL BETA-HALOPROPYL-AMINES

William S. Gump, Upper Montclair, and Edward Joseph Nikawitz, Passaic, N. J., assignors to The Givaudan Corporation, New York, N. Y., a corporation of New Jersey No Drawing. Continuation of application Serial No. 84,475, March 30, 1949. This application October 9, 1951, Serial No. 250,578

8 Claims. (Cl. 260—570.9)

This invention relates to novel salts of aromatic haloamines.

These novel chemicals are salts of dibenzyl beta-haloalkylamines in which the halogen radical is attached to a non-terminal carbon atom of the alkyl group. We have found that especially advantageous properties are possessed by the salts set forth above when the number of carbon atoms in the alkyl group dos not exceed six.

As some specific members of the novel chemical compounds disclosed herein the following may be noted:

Dibenzyl beta-chloropropylamine hydrochloride

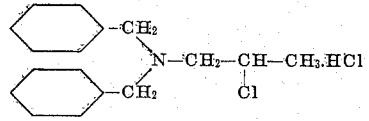

dibenzyl beta-chlorobutylamine hydrochloride

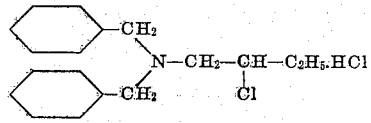

dibenzyl beta - chloro - beta - methylpropylamine hydrochloride

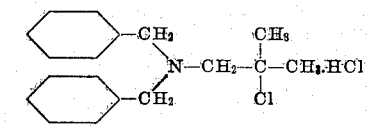

and the corresponding bromine analogs.

In general, the novel salts of this invention may be prepared by reacting an equivalent amount of inorganic or organic acids with the corresponding amines, preferably in some cases under anhydrous or substantially anhydrous conditions. The amines may be prepared by reacting the corresponding hydrohalides with at least an equivalent amount of alkaline material, such as, for example potassium carbonate. The hydrohalides may be prepared in general by reacting the beta-alcohols of the amines with thionyl chloride, thionyl bromide, or hydrogen bromide.

The new salts of this invention are crystalline solids under usual atmospheric conditions and in general are soluble in alcohols and glycols, difficultly soluble in water and insoluble in ether and hydrocarbons. The amines are in general high boiling liquids, varying in color from water-white to yellow. They are not soluble in water, but dissolve in ethyl alcohol, propylene glycol, and organic solvents generally.

Our novel chemical compounds exhibit unexpected and desirable medicinal properties, for example, as sympatholytic and adrenolytic agents. For therapeutic purposes these novel compounds may be administered orally or parenterally, and may be employed as tablets or in capsules or in solutions. In addition to their therapeutic properties our novel compounds are useful in organic chemical synthesis.

While our invention comprehends salts of the amines set forth above and acids in general, we prefer to employ those acids having an ionization constant of at least about $1 \times 10^{-2}$ at normal room temperature (about 25° C.). Examples of some suitable organic acids are picric, trichloroacetic, oxalic and maleic acids. Examples of some suitable inorganic acids are hydrochloric, hydrobromic, sulfuric, phosphoric (first hydrogen), perchloric, nitric and iodic acids.

In order to illustrate this invention more fully but without thereby limiting it, the following examples are given.

EXAMPLE 1

*Preparation of dibenzyl beta-chloropropylamine hydrochloride*

Into 150 grams of isopropanolamine, heated to 100° C., were dropped under stirring 253 grams of benzyl chloride during two hours; the mixture was then kept at 100° C. to 110° C., for five hours. A concentrated aqueous solution of 100 grams of sodium hydroxide was then added and the reaction product extracted with 600 grams of benzene. The benzene solution was washed with water, dried over anhydrous sodium sulfate and distilled. After removal of the benzene, the residual oil was distilled in vacuo and 168 grams of dibenzylamino isopropanol, boiling point 170° C. to 175° C./4 mm., were collected.

Dibenzylamino isopropanol (127 grams) were dissolved in 100 ml. of chloroform and cooled in an ice salt bath. To this solution, 70 grams of thionyl chloride in 100 ml. of chloroform were added under stirring during two hours. Stirring was then continued for another three hours under cooling. The reaction mixture was allowed to stand over night. The chloroform was distilled off, applying low vacuum at the end. Ethanol (50 ml.) was added and the mixture evaporated to dryness in vacuo. The crystalline residue was dissolved in 80 ml. of isopropanol and the solution purified by addition of 2 grams of decolorizing carbon and refluxing for thirty minutes. The filtered and cooled solution was brought to crystallization by adding isopropyl ether. Ninety-two grams of white crystals, melting at 165° C. to 167° C., were obtained. This is dibenzyl-beta-chloropropylamine hydrochloride.

Parenteral administration in man: this compound is dissolved in propylene glycol (sterile technic) to the extent of 5 per cent. It is stable in this solvent if the solution is acidified with concentrated hydrochloric acid, U. S. P. (2 ml. per 1000 ml. of solution). Injection is made slowly intravenously (either by syringe technic directly or by injection into the tubing of an intravenous saline or glucose infusion) after dilution with 0.9 per cent sodium chloride solution to at least 1:10. Evidence of physiological effect can usually be detected within ten to thirty minutes, as indicated by paralysis of adrenergic excitatory effector cells. For example, the pupils become constricted, the heart and blood vessels do not respond as before to sympathetic nerve impulses or to administered epinephrine, etc. Dosage: 5 to 10 mg./kg. per single dose. Effects may last several days.

Effective oral doses are in the neighborhood of five times the parenteral dose. The action takes approximately an hour to become manifested and persists for days, even after a single dose.

EXAMPLE 2

*Preparation of dibenzyl beta-chlorobutylamine hydrochloride (1-dibenzylamino-2-chlorobutane hydrochloride)*

(a) PREPARATION OF 1-DIBENZYLAMINO-3-BUTEN-2-OL

Seven grams (0.1 m.) of 3,4-epoxy-1-butene (Eastman Kodak), 19.7 grams (0.1 m.) of dibenzylamine and 0.5 ml. of water were refluxed for ten hours. Distillation of the reaction mixture gave 4 grams of forerun boiling to 157° C. at 2 mm. and 19.5 grams (65%) of light yellow oil, boiling point 157° C. to 163° C./2 mm.

Two grams of the oil were converted into its hydrochloride in ether solution. After recrystallization from alcohol-ether, the hydrochloride melted at 156° C. to 158° C. Another recrystallization raised the melting point to 157° C. to 158° C. (closed capillary).

*Anal.*—Calcd. for $C_{18}H_{22}NOCl$: Cl, 11.64. Found: Cl, 11.60.

(b) PREPARATION OF 1-DIBENZYLAMINO-2-BUTANOL HYDROCHLORIDE

Seventeen and five-tenths grams (.065 m.) of 1-dibenzylamino-3-buten-2-ol was dissolved in 50 cc. of alcohol and hydrogenated in the presence of Raney nickel catalyst at an initial pressure of 50 pounds per square inch. The calculated amount of hydrogen was taken up in twenty minutes. The solution was filtered free of catalyst and the solvent distilled at atmospheric pressure. The product distilled as a colorless oil, boiling point 156° C. to 160° C./2 mm. It weighed 14 grams (80% of the theoretical).

The oil was dissolved in 100 ml. of ether and treated with dry hydrogen chloride. The salt was collected, dissolved in 75 ml. of alcohol, the solution was filtered and 50 ml. of ether was added. Ten grams of solid, melting point 176° C. to 178° C., separated on cooling. After another recrystallization from alcohol-ether, the hydrochloride melted at 177° C. to 179° C. (closed capillary).

*Anal.*—Calcd. for $C_{18}H_{24}ClNO$: Cl, 11.57. Found: Cl, 11.52.

(c) PREPARATION OF 1-DIBENZYLAMINO-2-CHLOROBUTANE HYDROCHLORIDE

A solution of 42 grams (0.13 m.) of 1-dibenzylamino-2-butanol hydrochloride in 50 ml. of dry chloroform was cooled in an ice bath while 31 grams (0.26 m.) of thionyl chloride in 50 ml. of chloroform were added. A reflux condenser carrying a calcium chloride tube was attached to the flask and the solution was heated by a water bath at 60° C. to 65° C. for one and one-half hours. The condenser was then set for downward distillation and the solvent was removed in vacuo. Approximately 200 ml. of ether was added to the residual syrup which solidified on stirring and cooling. The solid was collected, dissolved in 100 ml. of chloroform followed by 300 ml. of ether. On cooling, 41 grams of a solid, melting point 141° C. to 143° C., were deposited. After recrystallization from alcohol-ether the hydrochloride weighed 28 grams (67%) and melted at 149° C. to 151° C. (closed capillary).

*Anal.*—Calcd. for $C_{18}H_{23}NCl_2$: C, 66.66; H, 7.14; Cl, 10.94. Found: C, 66.82; H, 7.06; Cl, 10.98.

EXAMPLE 3

*Preparation of dibenzyl beta-chloro-beta-methylpropylamine hydrochloride (1-dibenzylamino-2-methyl-2-chloropropane hydrochloride)*

(a) PREPARATION OF 2-DIBENZYLAMINO-2-METHYL-1-PROPANOL HYDROCHLORIDE

Eighty-nine grams (1.0 m.) of 2-amino-2-methyl-1-propanol was placed in a one liter, 3-necked flask equipped with dropping funnel, mercury sealed stirrer and thermometer dipping into the liquid. Two hundred fifty-six grams (2.0 m.) of benzyl chloride were added with stirring at such a rate that the temperature did not rise above 90° C. Then 106 grams (1.0 m.) of anhydrous sodium carbonate were added and the temperature was maintained at 80° C. to 90° C. for two hours. Water was added to the cooled reaction mixture and the organic layer separated. Three ether extracts of the aqueous solution were combined with the original organic layer and dried over anhydrous potassium carbonate. The solution was filtered and the solvent removed by distillation at atmospheric pressure. Distillation of the residue yielded 48% of 2-dibenzylamino-2-methyl-1-propanol, boiling point 182° C. to 220° C./11 mm., which solidified in the receiver. After recrystallization from alcohol, it melted at 76° C. to 78° C.

*Anal.*—Calcd. for $C_{18}H_{23}ON$: C, 80.25; H, 8.61. Found: C, 80.22; H, 8.62.

The hydrochloride was prepared in ether solution and recrystallized from alcohol-acetone mixture. It melted at 137° C. to 138° C.

*Anal.*—Calcd. for $C_{18}H_{24}NOCl$: Cl, 11.57. Found: Cl, 11.57.

(b) PREPARATION OF 1-DIBENZYLAMINO-2-METHYL-2-CHLOROPROPANE HYDROCHLORIDE

Fourteen grams (0.045 m.) of 2-dibenzylamino-2-methyl-1-propanol hydrochloride and 21 grams (0.180 m.) of thionyl chloride were mixed and heated under reflux for two hours. Excess thionyl chloride was evaporated in vacuo at 30° C. to 40° C., 25 ml. of benzene was added and the mixture again evaporated to dryness. The solid residue was dissolved in 40 ml. of No. 30 alcohol, the solution was filtered and 80 ml. of ether added. The colorless hydrochloride weighed 14 grams, melting point 151° C. to 155° C. (closed capillary). After another recrystallization from alcohol-ether the material weighed 12 grams (70% yield), melting point 152° C. to 154° C. (closed capillary). Another preparation gave a similar yield.

*Anal.*—Calcd. for $C_{18}H_{23}NCl_2$: C, 66.66; H, 7.14; Cl, 10.93. Found: C, 66.90; H, 7.62; Cl, 11.01.

EXAMPLE 4

*Dibenzyl beta-bromopropylamine hydrobromide*

Dibenzylamino isopropanol (51.0 grams), dissolved in 100 ml. of chloroform, was brought to reaction with 50.0 grams of thionyl bromide dissolved in 100 ml. of chloroform by adding the thionyl bromide during 2 hours under stirring to the ice-cooled aminoalcohol solution. The reaction mixture was allowed to remain at room temperature for 12 hours. After removal of the chloroform by distillation, the residue was refluxed with 100 ml. of alcohol in the presence of some decolorizing carbon, the solution was filtered and 550 ml. of ethyl ether added. The crystalline product was filtered off and another crystallization from alcohol (80 ml.)-ether (500 ml.) yielded 21.5 g. of white crystals, M. P. 144–146°.

*Anal.*—Calcd. for $C_{17}H_{21}NBr_2$: Br (ionized), 20.0; Br (total), 40.0. Found: Br (ionized), 20.0; Br (total), 40.1.

It will be noted, as in Example 3, that when two substituents are present on the carbon atom adjacent to the nitrogen atom in the alcohol precursor, treatment with thionyl chloride causes a rearrangement of the skeletal carbon structure to form the $\beta,\beta$-di-substituted-$\beta$-haloethylamine.

This application is a continuation of our co-pending application, Serial No. 84,475, filed March 30, 1949, which is a continuation in part of our therewith co-pending application, Serial No. 645,964, filed February 6, 1946, both of which applications now are abandoned.

The foregoing illustrates the practice of this invention, which however, is not to be limited thereby but is to be construed as broadly as permissible in view of the prior art and limited solely by the appended claims.

We claim:
1. Acid addition salts of amines having the following formula:

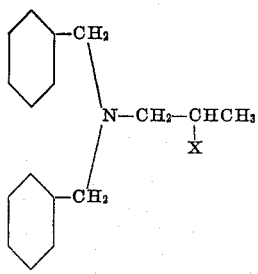

wherein X is a halogen.
2. Salts as defined in claim 1 in which X is chlorine.
3. Salts as defined in claim 1 in which X is bromine.
4. The acid addition salts of claim 1, the acids of which have an ionization constant of at least about $1 \times 10^{-2}$ at about 25° C.
5. Salts as defined in claim 4 in which X is chlorine.
6. Salts as defined in claim 4 in which X is bromine.
7. Dibenzyl beta-chloropropylamine hydrochloride.
8. Dibenzyl beta-bromopropylamine hydrobromide.

References Cited in the file of this patent

UNITED STATES PATENTS

| Number | Name | Date |
|---|---|---|
| 2,537,988 | Goodman et al. | Jan. 16, 1951 |
| 2,602,040 | Goodman et al. | July 1, 1952 |

FOREIGN PATENTS

| Number | Country | Date |
|---|---|---|
| 538,456 | Germany | Oct. 29, 1931 |
| 550,762 | Germany | Apr. 28, 1932 |